(12) United States Patent
Cui et al.

(10) Patent No.: US 8,829,116 B2
(45) Date of Patent: Sep. 9, 2014

(54) METHOD FOR PRODUCING BLOCK COPOLYMERS

(75) Inventors: Longlan Cui, Shanghai (CN); Shaoguang Feng, Shanghai (CN); Yanfei Liu, Shanghai (CN); Tao Wang, Shanghai (CN); Qingwei Zhang, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 185 days.

(21) Appl. No.: 13/279,481

(22) Filed: Oct. 24, 2011

(65) Prior Publication Data

US 2012/0101218 A1 Apr. 26, 2012

(30) Foreign Application Priority Data

Oct. 22, 2010 (CN) .......................... 2010 1 0532670

(51) Int. Cl.
| | | |
|---|---|---|
| C08F 2/01 | (2006.01) | |
| C09D 153/00 | (2006.01) | |
| C08F 2/00 | (2006.01) | |
| C08F 293/00 | (2006.01) | |
| C08F 212/12 | (2006.01) | |

(52) U.S. Cl.
CPC .............. *C08F 2/001* (2013.01); *C09D 153/00* (2013.01); *C08F 293/005* (2013.01); *C08F 212/12* (2013.01)
USPC ........ 525/241; 525/299; 525/191; 525/332.5; 525/324; 525/323; 524/543; 524/562

(58) Field of Classification Search
CPC .... C08F 2/001; C08F 293/005; C08F 212/12; C09D 153/00
USPC ........................ 525/241, 299; 524/543, 562
See application file for complete search history.

(56) References Cited

U.S. PATENT DOCUMENTS

| | | | |
|---|---|---|---|
| 5,760,136 A * | 6/1998 | Kato et al. ..................... | 525/100 |
| 6,204,319 B1 | 3/2001 | Houze et al. | |
| 6,506,836 B1 | 1/2003 | Bremser et al. | |
| 6,815,498 B2 | 11/2004 | Raether et al. | |
| 7,439,292 B2 | 10/2008 | Destarac et al. | |
| 2003/0170306 A1 | 9/2003 | Rather et al. | |
| 2004/0014872 A1 * | 1/2004 | Raether ........................ | 524/543 |

FOREIGN PATENT DOCUMENTS

| | | | |
|---|---|---|---|
| CN | 1884319 A | 12/2006 | |
| KR | 10-2008-0078356 A | 8/2008 | |
| WO | 0144327 A2 | 6/2001 | |

OTHER PUBLICATIONS

Jiang et al., "Block Copolymers Prepared by Free Radical Polymerization Using α-Methylstyrene-containing Precopolymer as Macroinitiator," Polymer Journal, vol. 40, No. 6, 2008, pp. 543-548.

* cited by examiner

*Primary Examiner* — Mark Kaucher
(74) *Attorney, Agent, or Firm* — Karl E. Stauss; Cantor Colburn LLP

(57) ABSTRACT

A method for producing an AB block copolymer with PDI is provided. The method comprises steps of:
1) reaction, in the presence of at least one free radical initiator, of a reaction mixture comprising a compound of formula (I), and
2) reaction, at a temperature of 45° C. or above, of a reaction mixture comprising an ethylenically unsaturated monomer B and, independent from that of step 1), a compound of formula (I) and the macroinitiator of step 1) in solvent(s) to obtain the AB block copolymer;
wherein the weight ratio of the compound of formula (I) to the macroinitiator in step 2) is at least 1:1000.

18 Claims, No Drawings

METHOD FOR PRODUCING BLOCK COPOLYMERS

BACKGROUND

This invention relates to a method for producing an AB block copolymer with controlled polydispersity index (PDI) and molecular weight by reaction of at least one macroinitiator, capable of free radical polymerization, in the presence of at least one monomer and a compound of the formula (I).

Block copolymers exhibit unique properties and as a result are more desirable than random copolymers or a blend of the two homopolymers synthesized from the respective monomers. When block copolymers have a predetermined structure, molecular weight and molecular weight distribution, such properties become more attractive to new concepts developers for various industrial applications.

There are various commercial block copolymer products currently produced using ARTP, RAFT or TEMPO approaches. These "living"/controlled free radical polymerization technologies are expensive, complex, cause odor or impurities during the reaction. U.S. Pat. No. 6,204,319 provides an amphiphilic AB-block copolymer prepared via Group Transfer Polymerization (GTP) and uses the AB block copolymer in forming carbon black pigment dispersions for aqueous coating compositions with improved black color jetness. The disadvantages of GTP are high cost and only limited monomers (acrylates) can be used with the technology. U.S. Pat. No. 6,815,498 provides a method for preparation of block copolymer via 1,1-diphenyl ethylene (DPE) containing macroinitiator. Due to the high ceiling temperature of DPE copolymer, which is approaching the boiling point of an aqueous system, the method is impossible to be used in waterborne solutions. U.S. Pat. No. 7,439,292 prepares phosphate containing amphiphilic block copolymer via Reversible Addition Fragmentation Transfer polymerization (RAFT), as an additive for film-forming compositions on a metallic surface or to protect said metallic surface against corrosion. However, the odorous and expensive thiocarbonate chain transfer agents prevent the technology from being widely applied.

Above cost and odor problems were well solved by Chinese Patent CN 100554291C which uses α-methyl styrene (AMS) containing prepolymer as macroinitiator in subsequent polymerization. The macroinitiator is a polymeric chain containing AMS residue sites. AMS polymer has a ceiling temperature, at which temperature it is degraded to the monomer. At a temperature greater than 60° C., the polymeric chain breaks at the sites of AMS due to the low ceiling temperature (61° C.) of AMS and thus leading to the formation of polymeric radicals capable of the initiation of the second stage polymerization with living characteristics. The process is low cost in raw material and easily handled. It has potential to prepare block copolymers on an industrial scale. The reference mentions that the macroinitiator is suitable for synthesis of block copolymers, graft copolymers by melt blending with polypropylene or used as compatibilizer in polypropylene blends to reach an in situ compatibilization. This approach is believed feasible for large scale manufacture of block copolymers. However, due to the uncontrolled second stage initiated by the macroinitiator, the block copolymer products obtained from the reference have uncontrolled high weight average and number average molecular weight (Mn generally higher than $4.0 \times 10^5$ g/mol and Mw reaches $3.0 \times 10^6$ g/mol) and broad molecular weight distribution (polydispersity index (PDI) of from 2.0 to 4.0, which affords problems relating to high viscosity, low gloss or poor color strength when used as binders in coating formulations. Therefore, a preparation method with higher conversion rate, capable of control the PDI and the molecule weight of the block copolymer products is desired.

SUMMARY OF INVENTION

The first aspect of the present invention is to provide a novel method for producing an AB block copolymer with controlled PDI, which comprises the following steps:

1) reaction, in the presence of at least one free radical initiator, of a reaction mixture comprising a compound of formula (I)

where R1 to R4, independently of one another, are each hydrogen, an alkyl radical, cycloalkyl radical or an aralkyl radical, each of which is unsubstituted or substituted, a substituted or unsubstituted aromatic hydrocarbon radical, with the proviso that R1 and R2 or R3 and R4, in pairs in each case, are one alkyl, cycloalkyl or arakyl and another aralkyl which is a substituted or unsubstituted aromatic hydrocarbon having 6 to 18 carbon atoms and a functional group which, in conjugation with the C—C double bond in the formula (I), has a multiple bond between a carbon atom and a heteroatom, and an ethylenically unsaturated monomer A to obtain a macroinitiator; and 2) reaction, at a temperature of 45° C. or above, of a reaction mixture comprising an ethylenically unsaturated monomer B and, independent from that of step 1), a compound of formula (I) and the macroinitiator of step 1) in solvent(s) to obtain the AB block copolymer;

wherein the weight ratio of the compound of formula (I) to the macroinitiator in step 2) is at least 1:1000.

The present invention relates not only to the method per se but also to a reaction product obtained from the step 2).

The second aspect of the present invention relates to a coating composition comprising the block copolymer prepared by the method of the first aspect of the invention.

DETAILED DESCRIPTION

For the purpose of describing the components in the compositions of this invention, all phrases comprising parenthesis denote either or both of the included parenthetical matter and its absence. For example, the phrase "(meth)acrylate" means acrylate, methacrylate, and mixtures thereof.

As used herein, unless otherwise indicated, the term "molecular weight" refers to the number average molecular weight of a polymer as measured by gel permeation chromatography (GPC) against a polyacrylic acid standard.

As used herein, unless otherwise indicated, the term "polydispersity index (PDI)" refers to molecular weight distribution of polymers and it is characterized by $M_w/M_n$.

As used herein, the term "vinyl" shall mean acrylic, vinyl ester, vinyl ether, monovinyl aromatic compounds, such as styrene and α-methyl styrene, and vinyl halides.

As used herein, the term "wt %" shall mean percent by weight.

All ranges recited are inclusive and combinable. For example, an amount of 1 wt % or more, or 2 wt % or more, or 4 wt % or more and up to 20 wt %, or up 15 wt %, will include ranges of 1 wt % or more to 20 wt % or less, 1 wt % or more to 15 wt % or less, 2 wt % or more to 15 wt % or less, 2 wt % or more to 20 wt % or less, 4 wt % or more to 15 wt % or less, and 4 wt % or more to 20 wt % or less.

The inventors have found that an AB block copolymer with controlled polydispersity index and further objects are achieved by the novel method as described in below two steps:

1) reaction, in the presence of at least one free radical initiator, of a reaction mixture comprising a compound of formula (I)

where R1 to R4, independently of one another, are each hydrogen, an alkyl radical, cycloalkyl radical or an aralkyl radical, each of which is unsubstituted or substituted, a substituted or unsubstituted aromatic hydrocarbon radical, with the proviso that R1 and R2 or R3 and R4, in pairs in each case, are one alkyl, cycloalkyl or arakyl and another aralkyl which is a substituted or unsubstituted aromatic hydrocarbon having 6 to 18 carbon atoms and a functional group which, in conjugation with the C—C double bond in the formula (I), has a multiple bond between a carbon atom and a heteroatom, and an ethylenically unsaturated monomer A to obtain a macroinitiator; and 2) reaction, at a temperature of 45° C. or above, of a reaction mixture comprising an ethylenically unsaturated monomer B and, independent from that of step 1), a compound of formula (I) and the macroinitiator of step 1) in solvent(s) to obtain the AB block copolymer;

wherein the weight ratio of the compound of formula (I) to the macroinitiator in step 2) is at least 1:1000.

In order to prepare a macroinitiator containing block A polymer for further free radical copolymerization of monomer B addition to the block A polymer, a step 1) free radical polymerization of a reaction mixture comprising monomer A and a compound of formula (I) is reacted in solvent(s). One embodiment of such copolymerization may be modified from the method described in Chinese Pat. No. CN20061001.2074.2, with variation in the amount of the initiator, for example, above 4 wt % based on the weight of the monomer mixture, a higher level of the initiator to improve the conversion rate. For example, a representative procedure may includes: mixing an initiator and a compound of formula (I) dissolved with monomer A in a container, de-gassing by $N_2$, adding monomer A drop wisely with stirring, raise the reaction temperature to 50° C. and keeping at 50° C. for at least 4 hours, and finally removing the solvent(s) and the residues.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 10% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadine-sulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

The compound of formula (I), as an ethylenically unsaturated reagent, reacts with an ethylenically unsaturated monomer A in the presence of a free radical initiator in step 1) to form a macroinitiator for further free radical polymerization. Such capability of further reaction of the macroinitiator is because of its lower ceiling temperature. For example, the ceiling temperature of AMS is 61° C., which causes the C—C bonds at backbone could be easily broken in a reaction temperature of above 61° C. to form free radicals.

Suitable compounds of formula (I) include, the formula (I) where R1 to R4, independently of one another, are each hydrogen, an alkyl radical, cycloalkyl radical or an aralkyl radical, each of which is unsubstituted or substituted, a substituted or unsubstituted aromatic hydrocarbon radical, with the proviso that R1 and R2 or R3 and R4, in pairs in each case, are one alkyl, cycloalkyl and another aralkyl which is a substituted or unsubstituted aromatic hydrocarbon having 6 to 18 carbon atoms and a functional group which, in conjugation with the C—C double bond in the formula (I), has a multiple bond between a carbon atom and a heteroatom such as, for example, α-methyl styrene, α-ethyl styrene, 4-methyl-α-methy styrene and the mixtures thereof; or the formula (I) where R1 to R4, independently of one another, are each hydrogen, an alkyl radical, cycloalkyl radical or an aralkyl radical, each of which is unsubstituted or substituted, a substituted or unsubstituted aromatic hydrocarbon radical, with the proviso that R1 and R2 or R3 and R4, in pairs in each case, are both aralkyl radicals each of which is a substituted or unsubstituted aromatic hydrocarbon having 6 to 18 carbon atoms and a functional group which, in conjugation with the C—C double bond in the formula (I), has a multiple bond between a carbon atom and a heteroatom such as, for example, 1,1-diphenyl ethylene, 1,1-dinaphthylethene, methyl-α-phenylacrylate and the mixtures thereof. Preferably, the compound of formula (I) is selected from α-methyl styrene (AMS) and 1,1-diphenylethylene (DPE).

The amount of the compound of formula (I) in step 1) may ranges from 0.01% to 50%, preferable from 0.1% to 30%, more preferable from 0.5% to 10%, in weight percentage, based on the amount of monomer A.

Surprisingly it has been found, as a core of the present invention, that the addition of the compound of formula (I), with a weight ratio of at least 1/1000 of the macroinitiator, into the step 2) free radical polymerization to react with the ethylenically unsaturated monomer B, in the presence of the macroinitiator obtained from the step 1) as free radical generator, is possible in effectively control the molecular weight distribution of the AB block copolymer products. The polymerization techniques used in step 2) to prepare the AB block copolymer are well known in the art, for example, a solvent-based polymerization as described in the prior art references U.S. Pat. No. 6,204,319, U.S. Pat. No. 6,815,498 and U.S. Pat. No. 7,439,292. The polymerization temperature is preferably from 60 to 90° C. in step 2).

The weight ratio of the compound of formula (I) to the macroinitiator in step 2) is at least 1:1000, preferable from 1:500 to 1:5, more preferable from 1:200 to 1:10.

In one embodiment of the present invention, the compound of formula (I) used in both step 1) and step 2) is AMS.

In another embodiment of the present invention, the compound of formula (I) used in both step 1) and step 2) is DPE.

In yet another embodiment of the present invention, the compound of formula (I) used in step 1) is AMS and DPE in step 2).

In yet another embodiment of the present invention, the compound of formula (I) used in step 1) is DPE and AMS in step 2).

In a preferable embodiment, the reaction mixture of step 2) further comprises a chain transfer agent to telomerize the molecule weight, for example, to less than 30,000 g/mol, alternatively less than 20,000 g/mol, or alternatively less than 8,000 g/mol, of the block copolymer. Suitable chain transfer agents include such as, for example, halogen compounds such as tetrabromomethane; allyl compounds; or mercaptans such as alkyl thioglycolates, alkyl mercaptoalkanoates, and C4-C22 linear or branched alkyl mercaptans, which may be used to lower the molecular weight of the emulsion polymer and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period such as, for example, in the kettle charge and in the reduction of residual monomer stage. Chain transfer agents are typically used in the amount of 0 to 5 wt %, based on the total weight of monomer used to form the aqueous block copolymer. A preferred level of chain transfer agent is from 0.01 to 0.5, more preferably from 0.02 to 0.4 and most preferably from 0.05 to 0.2 mole %, based on the total number of moles of monomer used to form the block copolymer.

Suitable solvent(s) may be used in the step 2) to increase the conversion rate. Examples of the solvent(s) include water, alcohols, ethers, esters; and dioxane, THF, DMF, DMSO, toluene, xylene and benzene, and the mixtures thereof. Preferably, the solvent(s) is selected from water, alcohols, esters; and dioxane, THF, toluene, xylene, and the mixtures thereof, more preferably dioxane, THF, xylene, toluene, an alcohol, and their mixtures such as, for example, dioxane/isopropanol/toluene.

The ethylenically unsaturated monomer A and monomer B are independently selected from any of the monomers compatible with $C_1$- to $C_{20}$-alkyl and hydroxyalkyl esters of monoethylenically unsaturated $C_3$- to $C_{10}$-monocarboxylic acids or $C_4$- to $C_8$-dicarboxylic acids, for example methyl (meth)acrylate, ethyl(meth)acrylate, propyl(meth)acrylate (all isomers), butyl (meth)acrylate (all isomers), 2-ethylhexyl (meth)acrylate, isobornyl (meth)acrylate, benzyl(meth)acrylate, phenyl(meth)acrylate, stearyl (meth)acrylate, diethyl maleate, hydroxyethyl(meth)acrylate (all isomers), hydroxypropyl(meth)acrylate, hydroxybutyl(meth)acrylate, furthermore (meth)acrylates of alkoxylated $C_1$- to $C_{18}$-alcohols which have been reacted with ethylene oxide, propylene oxide, butylene oxide or mixtures thereof; (meth)acrylonitrile, styrene, functionalized (meth)acrylates; acrylates and styrenes selected from glycidyl(meth)acrylate, dimethylaminoethyl (meth)acrylate, triethylene glycol (meth)acrylate, itaconic anhydride, itaconic acid, glycidyl acrylate, diethylaminoethyl(meth)acrylate, triethylene glycol (meth)acrylate, methacrylamide, N-tert-butylmethacrylamide, N-n-butylmethacrylamide, N-methylol(meth)acrylamide, N-ethylol (meth)acrylamide, N-tert-butylacrylamide, N-butylacrylamide, vinylbenzoic acid (all isomers), diethylaminostyrene (all isomers), p-methylstyrene, p-vinylbenzenesulfonic acid, trimethoxysilylpropyl(meth)acrylate, triethoxysilylpropyl(meth)acrylate, tributoxysilylpropyl(meth)acrylate, diethoxymethylsilylpropyl(meth)acrylate, dibutoxymethylsilylpropyl(meth)acrylate, diisopropoxymethylsilylpropyl (meth)acrylate, dim ethoxysilylpropyl (meth)acrylate, diethoxysilylpropyl (meth)acrylate, dibutoxysilylpropyl(meth)acrylate, diisopropoxysilylpropyl (meth) acrylate, vinyl acetate and vinyl butyrate, vinyl chloride, vinyl fluoride, vinyl bromide, vinyl alcohol, vinyl ethers of $C_1$- to $C_{18}$-alcohols, vinyl ethers of alkoxylated $C_1$- to $C_{18}$-alcohols and vinyl ethers of polyalkylene oxides, such as polyethylene oxide, polypropylene oxide or polybutylene oxide, monoethylenically unsaturated $C_3$- to $C_{10}$-monocarboxylic acids, their alkali metal salts and/or ammonium salts, for example (meth)acrylic acid, dimethylacrylic acid, ethylacrylic acid, allylacetic acid or vinylacetic acid, furthermore monoethylenically unsaturated $C_4$- to $C_8$-dicarboxylic acids, their monoesters, anhydrides, alkali metal salts and/or ammonium salts, for example maleic acid, fumaric acid, itaconic acid, mesaconic acid, methylenemalonic acid, citraconic acid, maleic anhydride, itaconic anhydride or methylmalonic anhydride; furthermore monoethylenically unsaturated monomers containing sulfo groups, for example allylsulfonic acid, styrenesulfonic acid, 2-acrylamido-2-methylpropanesulfonic acid, methallylsulfonic acid, vinylsulfonic acid, 3-sulfopropyl(meth)acrylate, furthermore monoethylenically unsaturated monomers containing phosphonic acid groups, for example vinylphosphonic acid, allylphosphonic acid or acrylamidoethylpropanephosphonic acid, furthermore amides and N-substituted amides of monoethylenically unsaturated $C_3$- to $C_{10}$ monocarboxylic acids or $C_4$- to $C_8$-dicarboxylic acids, for example acrylamide, N-alkylacrylamides or N,N-dialkylacrylamides, each having 1 to 18 carbon atoms in the alkyl group, such as N-methylacrylamide, N,N-dimethylacrylamide, N-tert-butylacrylamide or N-octadecylacrylamide, N-monomethylhexylmaleamide, N-monodecylmaleamide, diethylaminopropylmethacrylamide or acryl a midoglycollic acid; furthermore alkylaminoalkyl(meth) acrylates, for example dimethylaminoethyl acrylate, dim ethylaminoethyl methacrylate, ethylaminoethyl acrylate, diethylaminoethyl methacrylate, dimethylaminopropyl acrylate or dimethylaminopropyl methacrylate; furthermore vinyl esters, such as vinyl formate, vinyl acetate or vinyl propionate, where these may also be present in hydrolyzed form after the polymerization; furthermore N-vinyl compounds, for example N-vinylpyrrolidone, N-vinylcaprolactam, N-vinylformamide, N-vinyl-N-methylformamide, 1-vinylimidazole, furthermore vinyl ethers of $C_1$- to $C_{18}$ alcohols, vinyl ethers of alkoxylated $C_1$- to $C_{18}$-alcohols and vinyl ethers of polyalkylene oxides, such as polyethylene oxide, polypropylene oxide or polybutylene oxide, styrene or its derivatives, such as indene, dicyclopentadiene but except to the compounds with formula (I), monomers which carry amino or imino groups, such as dimethylaminoethyl methacrylate, diethylaminoethyl acrylate, diethylaminopropylmethacrylamide or allylamine, monomers which carry quaternary ammonium groups, for example present as salts as obtained by reacting the basic amino function with acids, such as hydrochloric acid, sulfuric acid, nitric acid, formic acid or acetic acid, or in quaternized form (examples of suitable quaternizing agents are dimethyl sulfate, diethyl sulfate, methyl chloride, ethyl chloride or benzyl chloride), e.g. dimethylaminoethyl acrylate hydrochloride, diallyldimethylammonium chloride, dimethylaminoethyl acrylate methylchloride, dimethylaminoethylaminopropylmethacrylamide methosulfate, vinylpyridinium salts or 1-vinylimidazolium salts; monomers in which the amino groups and/or ammonium groups are liberated only after polymerization and subsequent hydrolysis, for example N-vinylformamide or N-vinylacetamide.

The reaction mixture comprising monomer A forms a first block presented in the copolymer, denoted as "block A" hereby; and "block B" for the second block, correspondingly.

The reaction mixture of step 1) and/or step 2) may further comprises monomer(s) C. Examples of the monomer(s) C include any of the aforementioned monomer belonging to categories monomer A and monomer B, and the mixtures thereof.

In one preferable embodiment of the present invention, the block copolymer contains copolymerized monomers, by weight percentage based on the dry weight of the copolymer, A) 1 to 99% at least one ethylenically unsaturated monomer selected from styrene derivatives, (meth)acrylic acid, maleic anhydride, a $C_1$-$C_4$-alkyl or $C_1$-$C_4$-hydroxyalkyl (meth)acrylate, vinyl acetate, unsaturated monomers containing phosphonic acid groups, and substituted or unsubstituted vinylpyrrolidone;

B) 1 to 99% at least one ethylenically unsaturated monomer selected from styrene derivatives, (meth)acrylic acid, maleic anhydride, a $C_1$-$C_4$-alkyl or $C_1$-$C_4$-hydroxyalkyl (meth)acrylate, vinyl acetate, unsaturated monomers containing phosphonic acid groups, and substituted or unsubstituted vinylpyrrolidone; and C) 1 to 49% at least one ethylenically unsaturated selected from styrene derivatives, acrylic acid or methacrylic acid, maleic anhydride, a $C_1$-$C_4$-alkyl or $C_1$-$C_4$-hydroxyalkyl acrylate or methacrylate, vinyl acetates, unsaturated monomers containing phosphonic acid groups or substituted or unsubstituted vinylpyrrolidone wherein the monomers A and B and C are not identical with each other in chemical structures; and wherein monomer C presents in block A and/or block B of the copolymer.

The summation of the monomers' percentage in the block copolymer is 100%. When there is exclusive component, for example, the compound of formula (I), in the copolymer, other components may reduce their scale by lower the upper limit.

Within the monomers mentioned above, any monomer that falls in category of formula (I) does not fall in category of monomer A or monomer B.

The second aspect of the invention is to provide a coating composition comprising the block copolymer aforementioned. Suitable block copolymers includes AB block copolymers such as, for example, poly(acrylate acid-b-butyl acrylate), poly(maleic anhydride-b-butyl acrylate), and poly(acrylate acid-b-styrene).

Above said coating composition comprises at least one pigment. The coating composition may optionally contain extender(s). The coating composition has a PVC of from 40 to 90%, preferably of from 65 to 90%. The PVC is calculated by the following formula:

$$PVC(\%) = \frac{\text{volume of pigment(s)} + \text{volume extender(s)}}{\text{total dry volume of paint}}.$$

By "pigment" herein is meant a particulate inorganic material which is capable of materially contributing to the opacity or hiding capability of a coating. Such materials typically have a refractive index of greater than 1.8 and include, for example, titanium dioxide, zinc oxide, zinc sulfide, and the like. Preferred is titanium dioxide. By "extender" herein is meant a particulate inorganic material having a refractive index of less than or equal to 1.8 and greater than 1.3 and includes, for example, calcium carbonate, clay, calcium sulfate, aluminosilicates, silicates, zeolites, and diatomaceous earth. The coating composition may optionally contain solid or voided copolymer particles having a Tg of greater than 60° C., said copolymer particles may optionally including, as copolymerized units, aforementioned monomers; such copolymer particles are classified as extenders for purposes of PVC calculations herein.

Other materials are optionally added into the coating composition as adjuvants, including solvents, biocides, wetting agents, humectants, surfactants, neutralizers, buffers, free-thaw additives, antifoaming agents, tackifiers and etc.

The coating composition of this invention is contemplated to encompass architectural coating, industrial coating or paint compositions which may be described in the art as sheen, semi-gloss or flat coatings, primers, textured coatings, wood coating, plastic coating, paper coating, metal coating and the like. The coating composition is prepared by techniques which are well known in the coatings art. First, optionally, at least one pigment is well dispersed in an aqueous medium under high shear such as is afforded by a COWLES mixer or, in an alternative, at least one predispersed pigment may be used. Then the block copolymer is added under low shear stirring along with other coatings adjuvants, as desired. Alternatively, the block copolymer may be included in the optional pigment dispersion step.

The solids content of the coating composition may be from about 10% to about 70% by volume. The viscosity of the aqueous composition may be from 0.05 to 10 Pa·s (50 cps to 10,000 cps), as measured using a Brookfield viscometer; the viscosities appropriate for different application methods vary considerably.

The coating composition may be applied by conventional application methods such as, for example, brushing, roller application, and spraying methods such as, for example, air-atomized spray, air-assisted spray, airless spray, high volume low pressure spray, and air-assisted airless spray.

In the method of this invention the aqueous coating composition is applied to a substrate such as plastic, wood, metal, primed surfaces, previously painted surfaces, and cementitious substrates. The aqueous coating composition coated on the substrate is typically dried, or allowed to dry, at a temperature of from 1° C. to 95° C.

With the technique that the compound (I) is believed theoretically a backbone chain terminator, the block copolymers with controlled PDI and molecular weight can be prepared in an easy and scalable manner, which otherwise would not be available or can be prepared only with complex reactions or using expensive agents, for example, TEMPO products (BASF) EFKA™ 4300 series, such as, EFKA™4330, 4340 and 4360; and CTP (Controlled Polymerization Technical) products, such as Disperbyk-2010 from BYK.

The inventive process comprises an optimizable step 2) polymerization, which have been tested by using different macroinitiators, monomers and compounds having formula (I) structures via free radical polymerization to obtain well-defined block copolymer geometry, such as amphiphilic block structures. This process provides block copolymers with distinct molecular weight (for example, Mn<30,000) and with narrower polydispersity (for example, PDI<2.0) as compared to those block copolymers with same monomer composition but synthesized directly from corresponding monomers in the absence of the compound (I) in step 2).

The inventors have been found that the block copolymer endows the coating composition made therefrom with excellent hiding performance to an extent of saving at least 10% of $TiO_2$, and with improved scrub resistance performance than commercial random copolymers, and homopolymers.

In the present specification, the technical features in each preferred technical solution and more preferred technical solution can be combined with each other to form new technical solutions unless indicated otherwise. For briefness, the

EXAMPLES

Abbreviations

AMS: α-methyl styrene
AA: acrylic acid
BA: butyl acrylate
St: styrene
MMA: methyl methacrylate
PEM: 2-hydroxyethyl methacrylate phosphate
DPE: 1,1-diphenylethylene
AIBN: azodiisobutyronitrile
MA: maleic anhydride
DO/IPA/Tol: represents dioxane/isopropanol/toluene in all the tables
EA: ethyl acetate

Examples 1-2

A representative approach to prepare poly(AA-co-AMS) copolymer is described as the following for Example 1. A 4-neck 100 mL round bottle flask was equipped with addition funnel, condenser, thermometer, $N_2$ outlet and mechanical stir. 10 g AA was added into the addition funnel; while 1.1908 g AIBN and 0.164 g AMS were added and dissolved in 20 mL dioxane/10 mL toluene/10 mL isopropanol in the flask at r.t. The flask was immersed into an oil bath. The reaction system was de-gassed by $N_2$ over a period of 30 min with stirring at r.t. Afterwards the reaction temperature was increased to 50° C. Acrylic acid was added into the flask drop wisely. The polymerization was kept at 50° C. for 4 hours. The polymer solution was precipitated into toluene, filtered and washed with toluene several times, and then dried in vacuum oven overnight to obtain white powder. The polymer was soluble in water and it was clear water solution.

The same process as for Example 1, nevertheless, variations in raw materials and solvent(s) based on Table 1 was used to make Examples 2.

Applicant omits the descriptions for these combinations. However, all the technical solutions obtained by combing these technical features should be deemed as being literally described in the present specification in an explicit manner.

TABLE 1

Preparation of poly(AA-co-AMS) copolymers as macroinitiators

| Exp. No. | AA/AMS (molar ratio) | AMS (g) | AIBN (g) | Solvent(s) (mL) | $M_n$ (g/mol) | $M_w$ (g/mol) | PDI |
|---|---|---|---|---|---|---|---|
| 1 | 100 | 0.164 | 1.19 | DO/IP/Tol. 20/10/10 | 4500 | 8100 | 1.82 |
| 2 | 10 | 1.64 | 1.25 | DO/IPA/Tol 20/10/10 | 6000 | 11700 | 1.96 |

Examples 3-7

A representative approach to prepare poly(AA-b-BA) block copolymer is described as the following for Example 3. Into a 4-neck 100 mL round bottle flask which equipped with mechanical stir, condenser, thermometer and $N_2$ outlet, 10 g macroinitiator prepared in Example 1, 0.625 g AMS, and 20 g BA were added into a mixed solvent of 40 mL dioxane, 10 mL toluene and 10 mL isopropanol at r.t. under $N_2$ atmosphere. After de-gassed by $N_2$ for 30 min, the temperature was increase to 80° C., and was kept the reaction at 80° C. for 3 hours. Afterwards the solvent was removed by rotary equipment. The product was dried in vacuum oven overnight to obtain white powder.

The same process as for Example 3, nevertheless, variations in raw materials and solvent(s) based on Table 2 was used to make Example 4-7.

TABLE 2

Preparation of poly(AA-b-BA) block copolymers

| Exp. No. | Macroinitiator Exp. No. | Macroinitiator (g) | BA (g) | AMS (g) | Solvent(s) (mL) | $M_n$ (g/mol) | $M_w$ (g/mol) | PDI |
|---|---|---|---|---|---|---|---|---|
| 3 | 1 | 10 | 20 | 0.625 | DO/IPA/Tol 40/10/10 | 4900 | 7700 | 1.58 |
| 4 | 1 | 10 | 10 | 0.625 | DO/IPA/Tol 40/10/10 | 5300 | 8000 | 1.52 |
| 5 | 1 | 10 | 10 | 0 | DO/IPA/Tol 40/10/10 | 7200 | 13100 | 1.80 |
| 6 | 2 | 10 | 5 | 0.4 | THF: 40 | 6000 | 11900 | 1.98 |
| 7 | 2 | 10 | 5 | 0 | THF: 40 | 7300 | 19900 | 2.70 |

Examples 8-9

A representative approach to prepare other type of block copolymers is described as the following for Example. 8. Into a 4-neck 100 mL round bottle flask which equipped with mechanical stir, condenser, thermometer and $N_2$ outlet, 10 g macroinitiator prepared in Example 1, 0.1 g AMS, and 5 g St were added into 40 mL THF at r.t. under $N_2$ atmosphere. After de-gassed by $N_2$ for 30 min, the temperature was increased to 60° C., and kept in the reaction at 60° C. for 4 hours. Afterwards the solvent was removed by rotary equipment. The product was dried in vacuum oven overnight to obtain white powder.

The same process as for Example 8, nevertheless, variations in macroinitiator and monomer B (AMS) based on Table 3 was used to make Examples 9.

TABLE 3

Preparation of Poly(AA-b-Sty) block copolymers

| | | Amount of raw materials | | | | | | |
|---|---|---|---|---|---|---|---|---|
| Exp. No. | Macroinitiator Exp. No. | Macroinitiator (g) | Sty (g) | AMS (g) | Solvent(s) (mL) | $M_n$ (g/mol) | $M_w$ (g/mol) | PDI |
| 8 | 1 | 10 | 5 | 0.625 | THF | 14000 | 30400 | 2.17 |
| 9 | 1 | 10 | 5 | 0 | THF | 11800 | 30800 | 2.61 |

Examples 10

A representative approach to prepare poly(BA-co-AMS) copolymer is described as the following for Example 10. Into a 4-neck 100 mL round bottle flask which equipped with mechanical stir, condenser, thermometer and $N_2$ outlet, 5 g butyl acrylate, 0.465 g AMS, and 0.41 g AIBN and 30 mL THF were added at r.t. The flask was immersed into an oil bath. The reaction system was de-gassed by $N_2$ over a period of 30 min with stirring at r.t. Afterwards the reaction temperature was increased to 60° C. and kept at 60° C. for 4 hours. The polymer solution was precipitated into water/ethanol (5:1 in volume), filtered, washed with water/ethanol several times, and then dried in vacuum oven overnight to obtain transparent rubbery material.

TABLE 4

Preparation of poly(BA-co-AMS) copolymers as macroinitiators

| | Amount of raw materials | | | | | | |
|---|---|---|---|---|---|---|---|
| Exp. No. | BA/AMS (molar ratio) | AMS (g) | AIBN (g) | Solvent(s) (mL) | $M_n$ (g/mol) | $M_w$ (g/mol) | PDI |
| 10 | 5 | 0.465 | 0.41 | THF 30 | 8600 | 18000 | 2.09 |

Examples 11-13

A representative approach to prepare poly(BA-b-AA) block copolymer is described as the following for Example 11. Into a 4-neck 100 mL round bottle flask which equipped with mechanical stir, condenser, thermometer and $N_2$ outlet, 4 g macroinitiator prepared in example 10, 0.5 g AMS, and 10 g AA were added into a mixed solvent of 20 mL dioxide, 10 mL toluene and 10 mL isopropanol at r.t. under $N_2$ atmosphere. After de-gassed by $N_2$ for 30 min, the temperature was increased to 50° C. and kept in the reaction at 50° C. for 2 hours. Afterwards, the solvent was removed by rotary equipment. And the product was dried in vacuum oven overnight to obtain white solid.

The same process as for Example 11, nevertheless, variations in the amount of AMS based on Table 5 was used to make Example 12 and 13.

TABLE 5

Preparation of poly(BA-b-AA) block copolymers

| | | Amount of raw materials | | | | | | |
|---|---|---|---|---|---|---|---|---|
| Exp. No. | Macroinitiator Exp. No. | Macro-initiator (g) | AA (g) | AMS (g) | Solvent(s) (mL) | $M_n$ (g/mol) | $M_w$ (g/mol) | PDI |
| 11 | 10 | 4 | 10 | 0.5 | DO/IPA/Tol 20/10/10 | 6200 | 12600 | 2.00 |
| 12 | 10 | 4 | 10 | 0.1 | DO/IPA/Tol 20/10/10 | 7700 | 20000 | 2.58 |
| 13 | 10 | 4 | 10 | 0 | DO/IPA/Tol 20/10/10 | 9000 | 32000 | 3.58 |

Examples 14

Into a 4-neck 100 mL round bottle flask which equipped with mechanical stir, condenser, thermometer and $N_2$ outlet, 10 g macroinitiator prepared in Example 1, 0.625 g DPE, and 20 g butyl acrylate were added into a mixed solvent of 40 mL dioxane, 10 mL toluene and 10 mL isopropanol at r.t. under $N_2$ atmosphere. After de-gassed by $N_2$ for 30 min, the temperature was increase to 80° C., and was kept the reaction at 80° C. for 3 hours. Afterwards the solvent was removed by rotary equipment. The product was dried in vacuum oven overnight to obtain white powder.

TABLE 6

Preparation of Poly(AA-b-BA) via DPE as compound (I)

| | | Amount of raw materials | | | | | | |
|---|---|---|---|---|---|---|---|---|
| Exp. No. | Precursor Exp. No. | Precursor (g) | BA (g) | DPE (g) | Solvent(s) (mL) | $M_n$ (g/mol) | $M_w$ (g/mol) | PDI |
| 14 | 1 | 10 | 20 | 0.625 | DO/IPA/Tol: 40/10/10 | 8673 | 14657 | 1.69 |

Evaluation of Block Copolymer's Performance as Coating Binder

The block copolymer dispersants obtained from above examples were evaluated in paint formulation according to Table 7 at the terms of hiding value; Benchmarks were Orotan™ 731A available from Dow Chemical. The amount of the dispersants (solid) in paint formulation was 1.0% based on the weight of pigments and PVC was 40%.

TABLE 7

Paint formulations

| Ingredients (kg) | Paint 1 | Paint 2 | Paint 3 | Paint 4 | Paint 5 |
|---|---|---|---|---|---|
| | Orotan 731A | Exp. 3 | Exp. 4 | Exp. 3-2 | Exp. 4-2 |
| Water | 198.37 | 194.45 | 194.45 | 195.40 | 195.40 |
| Propylene Glycol | 14.88 | 14.58 | 14.58 | 14.66 | 14.66 |
| Orotan 731A | 12.10 | | | | |
| Exp. 3 | | 29.96 | | 29.44 | |
| Exp. 4 | | | 29.96 | | 29.44 |
| Triton CF-10 | 1.49 | 1.46 | 1.46 | 1.47 | 1.47 |
| Dispelair CF-246 | 2.48 | 2.43 | 2.43 | 2.44 | 2.44 |
| Cellusize QP-30000H | 3.47 | 3.40 | 3.40 | 3.42 | 3.42 |
| AMP-95 | 0.79 | 0.78 | 0.78 | 0.78 | 0.78 |
| Ti-Pure R-706 | 163.66 | 162.04 | 162.04 | 145.69 | 145.69 |
| Talc-800 | 39.67 | 39.28 | 39.28 | 38.58 | 38.58 |
| CC-700 | 99.19 | 98.21 | 98.21 | 110.00 | 110.00 |
| Grind Sub-Total | 536.10 | 546.60 | 546.60 | 541.87 | 541.87 |
| Primal AC-261 | 386.83 | 376.68 | 376.68 | 376.68 | 376.68 |
| Ropaque Ultra E | 39.67 | 39.28 | 39.28 | 39.28 | 39.28 |
| Texanol | 5.95 | 5.83 | 5.83 | 5.82 | 5.82 |
| Primal TT-935 | 0.00 | 0.00 | 0.00 | 0.00 | 0.00 |
| AMP-95 | 0.00 | 0.00 | 0.00 | 0.00 | 0.00 |
| Water | 31.44 | 31.60 | 31.60 | 36.35 | 36.35 |
| Total | 1000.00 | 1000.00 | 1000.00 | 1000.00 | 1000.00 |

* Raw materials Triton ™ CF-10 is available from Union Carbide; Disperlair ™ CF-246 is available from Blackburn Chemicals; Cellusize ™ QP-30000H is available from Dow Chemical; AMP 95 is available from Dow Chemical; Tipure ™ R-706 is available from DuPont; Talc-800 is available from Sanlong Mine Company (China); CC-700 is available from Guangfu Building Materials Group (China); Primal ™ AC-261 is available from Dow Chemical; Ropaque ™ Ultra E is available from Dow Chemical.

The hiding property of Paint 2 and Paint 3 which were formulated respectively with Example 2 and Example 3 as dispersant performed much better than that of Paint 1 which was formulated with Orotan™ 731A as control sample. Orotan™ 731A is a hydrophobic modified acrylate dispersant. For Paint 4 and Paint 5, 10% TiO$_2$ was replaced by CaCO$_3$ and maintaining the dispersants as Example 3 and Example 4 respectively, but the hiding value of the paints were also higher or similar with Paint 1 control.

TABLE 8

Hiding property of paints

| Paint No. | Paint 1 | Paint 2 | Paint 3 | Paint 4 | Paint 5 |
|---|---|---|---|---|---|
| S/mil | 5.249 | 5.605 | 5.633 | 5.365 | 5.226 |

The invention claimed is:

1. A method for producing an AB block copolymer with controlled polydispersity index, which comprises the following steps:
    1) reaction, in the presence of at least one free radical initiator, of a reaction mixture comprising a compound of formula (I)

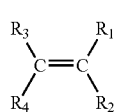
(I)

where R$_1$ to R$_4$, independently of one another, are each hydrogen, an alkyl radical, cycloalkyl radical or an aralkyl radical, each of which is unsubstituted or substituted, or a substituted or unsubstituted aromatic hydrocarbon radical, with the proviso that R$_1$ and R$_2$ or R$_3$ and R$_4$, in pairs in each case, are one alkyl, cycloalkyl, aralkyl, or a functional group which, in conjugation with the C=C double bond in the formula (I), has a multiple bond between a carbon atom and a heteroatom, and another aralkyl which is a substituted or unsubstituted aromatic hydrocarbon having 6 to 18 carbon atoms, and an ethylenically unsaturated monomer A to obtain a macroinitiator; and
    2) reaction, at a temperature of 45° C. or above, of a reaction mixture comprising an ethylenically unsaturated monomer B and, independent from that of step 1), a compound of formula (I) and the macroinitiator of step 1) in solvent(s) to obtain the AB block copolymer;
    wherein the weight ratio of the compound of formula (I) to the macroinitiator in step 2) is at least 1:1500 to 1:5.

2. The method according to claim 1, wherein the reaction mixture of step 2) further comprises a chain transfer agent.

3. The method according to claim 1, wherein the chain transfer agent is selected from halogen compounds, allyl compounds, and mercaptans.

4. The method according to claim 1, wherein the weight ratio of the compound of formula (I) to the macroinitiator in step 2) is from 1:200 to 1:10.

5. The method according to claim 1, wherein the solvent(s) of step 2) is selected from the group consisting of water, dioxane, THF, alcohols, ethers, esters, DMF, DMSO, toluene, xylene and benzene, and mixtures thereof.

6. The method according to claim 1, wherein the compound of formula (I) in step 1) or step 2) is independently selected from alpha-methylstyrene, 1,2-diphenylethylene or their mixture.

7. The method according to claim 4, wherein the weight ratio of the compound of formula (I) to the monomer A is from 1:10000 to 1:2 in step 1).

8. The method according to claim 1, wherein the reaction temperature is from 55° C. to 90° C. in step 2).

9. A coating composition comprising the block copolymer prepared by the method of claim 1.

10. The method according to claim 1, wherein the AB block copolymer has a polydispersity index of less than 2.0.

11. The method according to claim 1, wherein the compound of formula (I) in step 1) or step 2) independently comprises alpha-methylstyrene, alpha-ethylstyrene, 4-methyl-alpha-methylstyrene, 1,1-diphenylethylene, 1,1-dinaphthylethene, methyl-alpha-phenylacrylate, or mixtures thereof.

12. The method according to claim 1, wherein the compound of formula (I) in step 1) or step 2) independently comprises alpha-methylstyrene, alpha-ethylstyrene, 4-methyl-alpha-methylstyrene, or mixtures thereof.

13. A method for producing an AB block copolymer with controlled polydispersity index, which comprises the following steps:
    1) reaction, in the presence of at least one fire radical initiator, of a first reaction mixture comprising a compound of formula (I)

(I)

where R$_1$ to R$_4$, independently of one another, are each hydrogen, an alkyl radical, cycloalkyl radical or an aralkyl radical, each of which is unsubstituted or substituted, or a substituted or unsubstituted aromatic hydrocarbon radical, with the proviso that $R_1$ and $R_2$ or $R_3$ and $R_4$, in pairs in each case, are one alkyl, cycloalkyl, aralkyl, or a functional group which, in conjugation with the C—C double bond in the formula (I), has a multiple bond between a carbon atom and a heteroatom, and another aralkyl which is a substituted or unsubstituted aromatic hydrocarbon having 6 to 18 carbon atoms,
and an ethylenically unsaturated monomer A to obtain a macroinitiator;

2) isolation of the macroinitiator from the first reaction mixture; and
3) reaction, at a temperature of 45° C. or above, of a second reaction mixture comprising an ethylenically unsaturated monomer B and, independent from that of step 1), a compound of formula (I) and the macroinitiator of step 2) in solvent(s) to obtain the AB block copolymer;
wherein the weight ratio of the compound of formula (I) to the macroinitiator in step 3) is from 1:500 to 1:5.

14. The method according to claim 13, wherein the compound of formula (I) in step 1) or step 2) independently comprises alpha-methylstyrene, alpha-ethylstyrene, 4-methyl-alpha-methylstyrene, 1,1-diphenylethylene, 1,1-dinaphthylethene, methyl-alpha-phenylacrylate, or mixtures thereof.

15. The method according to claim 13, wherein the compound of formula (I) in step 1) or step 2) independently comprises alpha-methylstyrene, alpha-ethylstyrene, 4-methyl-alpha-methylstyrene, or mixtures thereof.

16. The method according to claim 13, wherein the compound of formula (I) in step 1) or step 2) is independently selected from alpha-methylstyrene, 1,2-diphenylethylene or their mixture.

17. The method according to claim 13, wherein the weight ratio of the compound of formula (I) to the monomer A is from 1:10000 to 1:2 in step 1).

18. A coating composition comprising the block copolymer prepared by the method of claim 13.

* * * * *